US012013687B1

(12) United States Patent
Mazur et al.

(10) Patent No.: US 12,013,687 B1
(45) Date of Patent: Jun. 18, 2024

(54) SYSTEMS AND METHODS FOR ENERGY MANAGEMENT OF OPERATION TECHNOLOGY NETWORKS BY AN INFORMATION TECHNOLOGY NETWORK

(71) Applicant: Rockwell Automation Technologies, Inc., Mayfield Heights, OH (US)

(72) Inventors: Dave C. Mazur, Mequon, WI (US); Rob A. Entzminger, Shawnee, KS (US); Jonathan A. Mills, Mayfield Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 18/220,638

(22) Filed: Jul. 11, 2023

(51) Int. Cl.
   *G05B 19/418* (2006.01)
   *G06F 9/54* (2006.01)
(52) U.S. Cl.
   CPC ......... *G05B 19/4185* (2013.01); *G06F 9/541* (2013.01); *G05B 2219/23102* (2013.01); *G05B 2219/36037* (2013.01)
(58) Field of Classification Search
   None
   See application file for complete search history.

(56) References Cited

U.S. PATENT DOCUMENTS

2015/0316945 A1* 11/2015 Soya ............... H04L 67/12
                                                    700/295

* cited by examiner

*Primary Examiner* — Sean Shechtman
(74) *Attorney, Agent, or Firm* — Fletcher Yoder, P.C.

(57) ABSTRACT

An industrial automation system is described including multiple devices, a master container node, a container node, and a control system. The devices may connect to an external application programming interface (API) of an external device (e.g., an electric power utility company), receive an API call from the external API indicative of a time window for monitoring electrical power consumption of the devices by the external API, and output one or more information technology (IT) commands in response to receiving the API call. The container node may be coupled to the master container node, wherein the container node may map the IT commands to operation technology (OT) commands. The control system may be coupled to the container node and the plurality of devices. The control system may implement the OT commands on the devices to perform one or more operations.

20 Claims, 6 Drawing Sheets

SYSTEMS AND METHODS FOR ENERGY MANAGEMENT OF OPERATION TECHNOLOGY NETWORKS BY AN INFORMATION TECHNOLOGY NETWORK

BACKGROUND

The present disclosure generally relates to systems and methods for implementing a container orchestration system in an operational technology (OT) or an industrial platform. More particularly, embodiments of the present disclosure are related to systems and methods for leveraging container orchestration systems to control electrical power consumption of OT devices.

Industrial automation systems are managed and operated using automation control and monitoring systems (e.g., industrial control system), particularly in industrial automation environments. Such applications may include controlling a wide range of components, such as valves, electric motors, and so forth, and the collection of data via sensors. Typical industrial control systems may include one or more components, such as programming terminals, automation controllers, input/output (I/O) modules, communication networks, human-machine interface (HMI) terminals, and the like.

Generally, industrial control systems operate in the OT environment are used to control industrial devices accessible via an OT network. Although the industrial control systems may be used to manage the operations of the devices within the OT network, improved systems and methods for operating devices within the OT network are desirable. For example, certain technologies available in the information technology (IT) environment may provide certain industrial control system users additional management tools that they employ for operating their IT assets.

This section is intended to introduce the reader to aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, an industrial automation system is described including multiple devices, a first container node, a second container node, and a control system. The devices may receive an application programming interface (API) call from an external API indicative of a time window for monitoring electrical power consumption of the devices by the external API, and output one or more information technology (IT) commands in response to receiving the API call. The IT commands may cause at least one of the devices to adjust one or more operations during the time window. The second container node may be coupled to the first container node and the second container node may map the IT commands to operation technology (OT) commands. The control system may be coupled to the second container node and the at least one of the devices. The control system may implement the OT commands on the at least one of the devices In another embodiment, a method is described. The method may include receiving, by a container orchestration system of an industrial automation system, an application programming interface (API) call indicative of a time window for monitoring electrical power consumption of multiple devices of the industrial automation system from an external API. The method may include outputting, by the container orchestration system, information technology (IT) commands in response to receiving the API call. The one or more IT commands may cause at least one of the multiple devices to adjust one or more operations during the time window. The method may include mapping, by the container orchestration system, the IT commands to operation technology (OT) commands, wherein a control system may implement the OT commands on the devices.

In a further embodiment, a non-transitory computer-readable medium including instructions that, when executed by processing circuitry of a cloud computing system, causes the processing circuitry to perform operations is described. The operations include receiving an application programming interface (API) call indicative of a time window for monitoring electrical power consumption of multiple devices of the industrial automation system from the external API. The operations include outputting one or more information technology (IT) commands to a container node of the industrial automation system in response to receiving the API call. The IT commands may cause at least one of the multiple devices to adjust one or more operations during the first time window. The operations include mapping the IT commands to operation technology (OT) commands, wherein a control system of the industrial automation system may implement the OT commands on the devices to perform one or more functions.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

Figure 1:
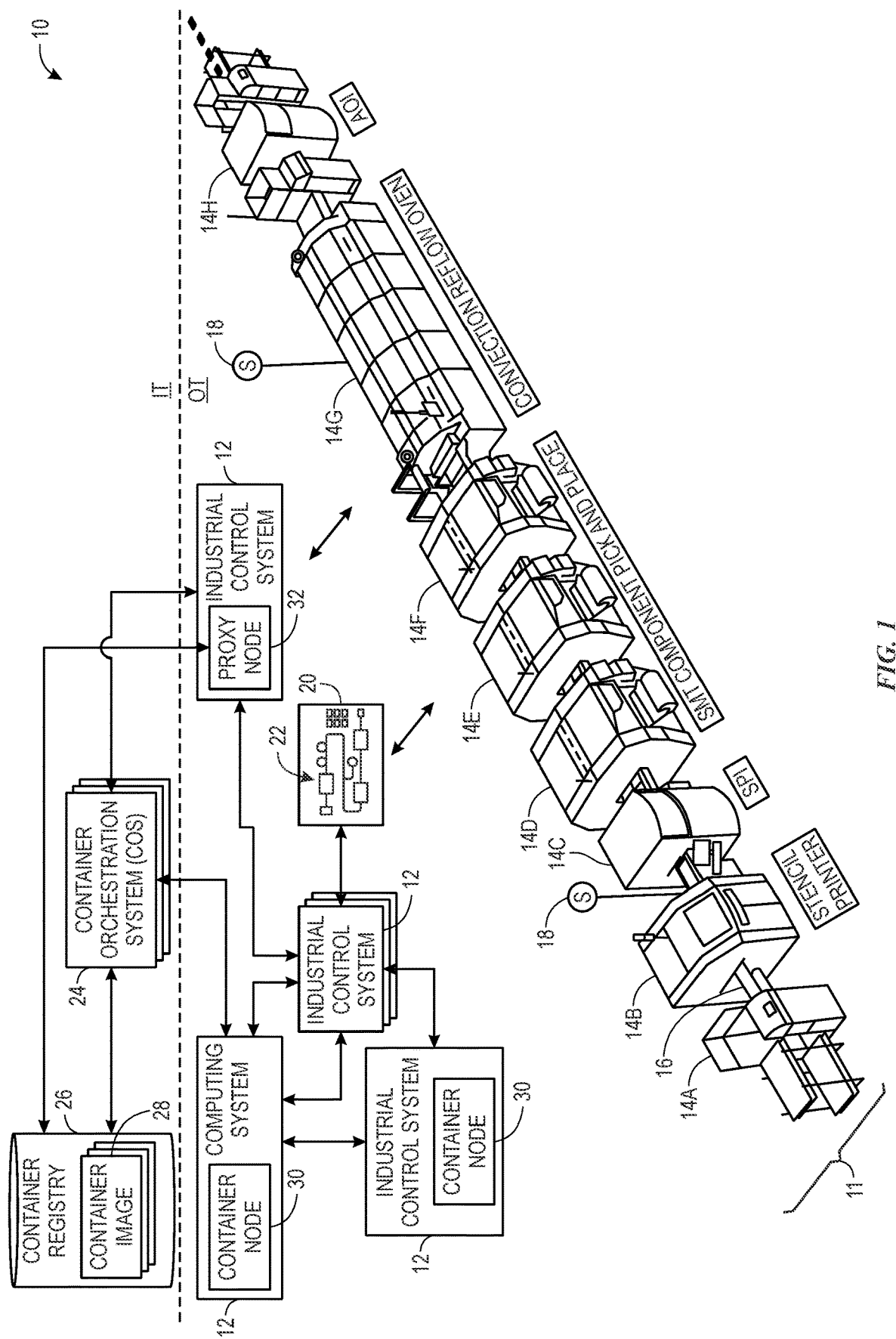
FIG. 1 is a perspective view of an example industrial automation system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are generally directed to an energy management network for dynamically monitoring and/or controlling electrical power consumption of an industrial automation system. The industrial automation system may include one or multiple operational technology (OT) networks each including one or multiple industrial automation lines. In turn, each industrial automation line may include a number of OT devices to perform a respective operation. The industrial automation lines may include industrial operational lines having automation components and/or networks deployed thereon.

The energy management network may include an information technology (IT) network integrated with the OT networks. In some cases, the OT devices may generate OT data corresponding to electrical power consumption of the OT devices. The IT network may receive and store the OT data for analysis with IT data by the IT network (e.g., in an IT space). As such, the energy management network may provide visibility to the electrical power consumption of the OT devices via the IT network.

In some cases, an OT device may receive OT commands corresponding to adjusting an operational mode of the OT device. For example, the OT device may receive OT commands indicative of reducing electrical power consumption of the OT device. The energy management network may map (e.g., convert) IT commands (e.g., software commands) generated by an IT communication protocol to OT commands generated by an OT communication protocol for implementation the OT devices. As such, the energy management network may implement OT commands on the OT devices based on the IT commands.

The energy management network may include an edge appliance to map IT commands to OT commands. The edge appliance may include circuitry disposed between the IT network and the OT network(s) to integrate the IT space and the OT space(s). Moreover, the edge appliance may implement the mapped OT commands on targeted OT devices. The edge appliance may control targeted OT devices of one or multiple industrial automation lines based on receiving the IT commands. That is, the targeted OT devices may be distributed between a different number of industrial automation lines.

In some cases, the edge appliance may implement the OT commands on the targeted OT devices to reduce the electrical power consumption of the targeted OT devices. Accordingly, the energy management network may provide energy management functions, such as monitoring and controlling the electrical energy consumptions, based on having an IT network integrated with the one or multiple OT networks via one or more edge appliances.

With the foregoing in mind, in some embodiments, the energy management network may receive an application programming interface (API) call from an electrical power utility company. The API call may be indicative of a time window for monitoring electrical power consumption of one or multiple target OT devices and/or one or more target industrial automation lines of an OT network. For example, the electrical power utility company may determine a unit cost for electrical power consumption of a factory including the target OT devices and/or the target industrial automation lines based on the electrical power consumption during the time window. If not accounted for, the electrical power utility company may receive an anomalously high electrical power consumption of the target OT devices and/or the target industrial automation lines.

In some cases, the IT network (e.g., via the edge appliance) may reduce the electrical power consumption of the target OT devices and/or the target industrial automation lines to an average electrical power consumption amount of the OT devices, below the average power consumption amount, near zero power consumption amount, or a negative power consumption amount. As such, the energy management network may improve operations of the OT network based on controlling the electrical power consumption during the time window by the IT network. Moreover, the IT network may control electrical power consumption of additional OT networks via the edge appliance. Accordingly, the energy management network may improve operations of multiple OT networks based on controlling the respective electrical power consumption during the time window by the IT network. Additional details with regard to the energy management network will be discussed below with reference to FIGS. 1-9.

By way of introduction, FIG. 1 is a perspective view of a portion of an example industrial automation system 10 controlled by an energy management network. The industrial automation system 10 may include an industrial automation line 11 including multiple OT devices. Although an example industrial automation line 11 of the industrial automation system 10 is shown in FIG. 1, it should be appreciated that the industrial automation system 10 may include multiple industrial automation lines 11 not shown for simplicity. For example, the industrial automation system 10 may include multiple plants each including a number of industrial automation lines 11. Moreover, in some embodiments, the plants may be disposed at different geographical locations.

In the depicted embodiment, the industrial automation line 11 includes stations 14 (e.g., OT devices) having machine components and/or machines to conduct functions within an automated process, such as silicon wafer manufacturing, as is depicted. The automated process may begin at a station 14A used for loading objects, such as substrates, into the industrial automation line 11 via a conveyor section 16. The conveyor section 16 may transport the objects to a station 14B to perform a first action, such a printing solder paste to the substrate via stenciling. As objects exit from the station 14B, the conveyor section 16 may transport the objects to a station 14C for solder paste inspection (SPI) to inspect printer results, to a station 14D, 14E, and 14F for surface mount technology (SMT) component placement, to a station 14G for convection reflow oven to melt the solder to make electrical couplings, and finally to a station 14H for automated optical inspection (AOI) to inspect the object manufactured (e.g., the manufactured printed circuit board). After the objects proceed through the various stations, the objects may be removed from the station 14H, for example, for storage in a warehouse or for shipment. Clearly, for other applications, the particular system, machine components, machines, stations, and/or conveyors may be different or specially adapted to the application.

For example, the industrial automation line 11 may include machinery to perform various operations in a compressor station, an oil refinery, a batch operation for making food items, chemical processing operations, brewery operations, mining operations, a mechanized assembly line, and so forth. Accordingly, the industrial automation line 11 may include a variety of operational components, such as electric motors, valves, actuators, temperature elements, pressure sensors, or a myriad of machinery or devices used for manufacturing, processing, material handling, and other applications. The industrial automation line 11 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation line 11 may also include motors, protection devices, switchgear, compressors, and the like. Each of these described operational components (e.g., OT devices) may correspond to and/or generate a variety of OT data regarding operation, status, sensor data, operational modes, alarm conditions, or the like, that may be desirable to output for analysis with IT data from an IT network, for storage in an IT network, for analysis with expected operation set points (e.g., thresholds), or the like.

The industrial automation line 11 may be controlled by one or more industrial control systems 12. In certain embodiments, one or more properties of the industrial automation line 11 equipment, such as the stations 14, may be monitored and controlled by the industrial control systems 12 for regulating control variables. For example, sensing devices (e.g., sensors 18) may monitor various properties of the industrial automation line 11 and may be used by the industrial control systems 12 at least in part in adjusting operations of the industrial automation line 11 (e.g., as part of a control loop). In some cases, the industrial automation line 11 may be associated with devices used by other equipment. For instance, scanners, gauges, valves, flow meters, and the like may be disposed on or within the industrial automation line 11. Here, the industrial control systems 12 may receive data from the associated devices and use the data to perform their respective operations more efficiently. For example, a controller of the industrial automation line 11 associated with a motor drive may receive data regarding a temperature of a connected motor and may adjust operations of the motor drive based on the data.

The industrial control systems 12 may be communicatively coupled to a display/operator interface 20 (e.g., a human-machine interface (HMI)) and to devices of the industrial automation line 11. It should be understood that any suitable number of industrial control systems 12 may be used in a particular industrial automation line 11 and/or a particular industrial automation system 10 embodiment. The industrial control systems 12 may facilitate representing components of the industrial automation line 11 through programming objects that may be instantiated and executed to provide simulated functionality similar or identical to the actual components, as well as visualization of the components, or both, on the display/operator interface 20. The programming objects may include code and/or instructions stored in the industrial control systems 12 and executed by processing circuitry of the industrial control systems 12. The processing circuitry may communicate with memory circuitry to permit the storage of the component visualizations.

As illustrated, a display/operator interface 20 depicts representations 22 of the components of the industrial automation line 11. The industrial control system 12 may use data transmitted by sensors 18 (e.g., OT devices) to update visualizations of the components via changing one or more statuses, states, and/or indications of current operations of the components. These sensors 18 may be any suitable device adapted to provide information regarding process conditions. Indeed, the sensors 18 may be used in a process loop (e.g., control loop) that may be monitored and controlled by the industrial control system 12. As such, a process loop may be activated based on process inputs (e.g., an input from the sensor 18) or direct input from a person via the display/operator interface 20. The person operating and/or monitoring the industrial automation line 11 may reference the display/operator interface 20 to determine various statuses, states, and/or current operations of the industrial automation line 11, the industrial automation system 10, and/or for a particular component. Furthermore, the person operating and/or monitoring the industrial automation line 11 and/or the industrial automation system 10 may adjust to various components to start, stop, power-down, power-on, or otherwise adjust an operation of one or more components of the industrial automation line 11 through interactions with control panels or various input devices.

The industrial automation system 10 may be considered a data-rich environment with several processes and operations that each respectively generate a variety of data. For example, the industrial automation line 11 may be associated with material data (e.g., data corresponding to substrate or raw material properties or characteristics), parametric data (e.g., data corresponding to machine and/or station performance, such as during operation of the industrial automation line 11), test results data (e.g., data corresponding to various quality control tests performed on a final or intermediate product of the industrial automation line 11), or the like, that may be organized and sorted as OT data. In addition, sensors 18 may gather OT data indicative of one or more operations of the industrial automation system 10 or the industrial control system 12. In this way, the OT data may be analog data or digital data indicative of measurements, statuses, alarms, or the like associated with operation of the industrial automation system 10 or the industrial control system 12.

The industrial control systems 12 described above may operate in an OT network (e.g., OT space) in which OT data is used to monitor and control the OT devices, such as the sensors 18 and/or the equipment illustrated in the stations 14 of the industrial automation line 11 or other industrial equipment and/or industrial automation lines and/or systems. The OT space, environment, or network generally includes direct monitoring and control operations that are coordinated by the industrial control system 12 and a corresponding OT device. For example, the industrial control system 12 may include a programmable logic controller (PLC) operating in the OT network to monitor and/or control operations of an OT device (e.g., drive, motor). The industrial control systems 12 may be specifically programmed or configured to communicate directly with the respective OT devices.

A container orchestration system 24, on the other hand, may operate in an information technology (IT) environment. That is, the container orchestration system 24 may include a cluster of multiple computing devices that coordinates an automatic process of managing or scheduling work of individual containers for applications within the computing devices of the cluster. In other words, the container orchestration system 24 may be used to automate various tasks at scale across multiple computing devices.

By way of example, the container orchestration system 24 may automate tasks such as configuring and scheduling of containers, provisioning and deploying containers, determining availability of containers, configuring applications in terms of the containers that they run in, scaling of containers to equally balance application workloads across an infrastructure, allocating resources between containers, performing load balancing, traffic routing, and service discovery of containers, performing health monitoring of containers, securing the interactions between containers, and the like. In any case, the container orchestration system 24 may use configuration files to determine a network protocol to facilitate communication between containers, a storage location to save logs, and the like. The container orchestration system 24 may also schedule deployment of containers into clusters and identify a host (e.g., node) that may be best suited for executing the container. After the host is identified, the container orchestration system 24 may manage the lifecycle of the container based on predetermined specifications.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry 26 as container images 28. The container registry 26 may be any suitable data storage or database that may be accessible to the container orchestration system 24. The container image 28 may correspond to an executable software package that includes the tools and data employed to execute a respective application. That is, the container image 28 may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system 24. The deployment configuration file may be stored in the container registry 26 along with the respective container images 28 associated with the deployment configuration file. The deployment configuration file may include a list of different pods and a number of replicas for each pod that should be operating within the container orchestration system 24 at any given time.

Each pod may correspond to a logical unit of an application, which may be associated with one or more containers. The container orchestration system 24 may coordinate the distribution and execution of the pods listed in the deployment configuration file, such that the desired state is continuously met. In some embodiments, the container orchestration system 24 may include a master node that retrieves the deployment configuration files from the container registry 26, schedules the deployment of pods to the connected nodes, and ensures that the desired state specified in the deployment configuration file is met. For instance, if a pod stops operating on one node, the master node may receive a notification from the respective worker node that is no longer executing the pod and deploy the pod to another worker node to ensure that the desired state is present across the cluster of nodes.

As mentioned above, the container orchestration system 24 may include a cluster of computing devices, computing systems, or container nodes that may work together to achieve certain specifications or states, as designated in the respective container. In some embodiments, container nodes 30 may be integrated within industrial control systems 12 as shown in FIG. 1. That is, container nodes 30 may be implemented by the industrial control systems 12, such that they appear as worker nodes to the master node in the container orchestration system 24. In this way, the master node of the container orchestration system 24 may send commands to the container nodes 30 that are also configured to perform applications and operations for the respective industrial equipment.

In the depicted embodiment, the industrial automation system 10 may include one or more container nodes 30 associated with the depicted industrial control system 12 and the depicted industrial automation line 11. In some embodiments, the industrial automation system 10 may also include multiple industrial automation lines 11 not shown for simplicity. In some cases, the industrial automation system 10 may include additional industrial control systems 12 associated with the additional industrial automation lines 11. The industrial automation system 10 may include additional container nodes 30 implemented by the additional industrial control systems 12. Accordingly, the master node of the container orchestration system 24 may send commands to the additional container nodes 30 that are also configured to perform applications and operations for the respective industrial equipment of the respective industrial automation lines 11.

With this in mind, the container nodes 30 may be integrated with the industrial control systems 12, such that they serve as passive-indirect participants, passive-direct participants, or active participants of the container orchestration system 24. As passive-indirect participants, the container nodes 30 may respond to a subset of all of the commands that may be issued by the container orchestration system 24. In this way, the container nodes 30 may support limited container lifecycle features, such as receiving pods, executing the pods, updating a respective filesystem to included software packages for execution by the industrial control system 12, and reporting the status of the pods to the master node of the container orchestration system 24.

The limited features implementable by the container nodes 30 that operate in the passive-indirect mode may be limited to commands that the respective industrial control system 12 may implement using native commands that map directly to the commands received by the master node of the container orchestration system 24. Moreover, the container node 30 operating in the passive-indirect mode of operation may not be capable to push the packages or directly control the operation of the industrial control system 12 to execute the package. Instead, the industrial control system 12 may periodically check the file system of the container node 30 and retrieve the new package at that time for execution.

As passive-direct participants, the container nodes 30 may operate as a node that is part of the cluster of nodes for the container orchestration system 24. As such, the container node 30 may support the full container lifecycle features. That is, container node 30 operating in the passive-direct mode may unpack a container image and push the resultant package to the industrial control system 12, such that the industrial control system 12 executes the package in response to receiving it from the container node 30. As such, the container orchestration system 24 may have access to a worker node that may directly implement commands received from the master node onto the industrial control system 12.

In the active participant mode, the container node 30 may include a computing module or system that hosts an operating system (e.g., Linux) that may continuously operate a container host daemon that may participate in the management of container operations. As such, the active participant container node 30 may perform any operations that the master node of the container orchestration system 24 may perform. By including a container node 30 operating in the OT space, the container orchestration system 24 is capable of extending its management operations into the OT space. That is, the container node 30 may provision devices in the OT space, serve as a proxy node 32 to provide bi-directional coordination between the IT space and the OT space, and the like. For instance, the container node 30 operating as the proxy node 32 may intercept orchestration commands and cause industrial control system 12 to implement appropriate machine control routines based on the commands. The industrial control system 12 may confirm the machine state to the proxy node 32, which may then reply to the master node of the container orchestration system 24 on behalf of the industrial control system 12.

Additionally, the industrial control system 12 may share an OT device tree via the proxy node 32. As such, the proxy node 32 may provide the master node with state data, address data, descriptive metadata, versioning data, certificate data, key information, and other relevant parameters concerning the industrial control system 12. Moreover, the proxy node 32 may issue requests targeted to other industrial control systems 12 to control other OT spaces and/or devices. For instance, the proxy node 32 may translate and forward commands to a target OT device using one or more OT communication protocols, may translate and receive replies from the OT devices, and the like. As such, the proxy node 32 may perform health checks, provide configuration updates, send firmware patches, execute key refreshes, and other OT operations for other OT devices.

Figure 2:
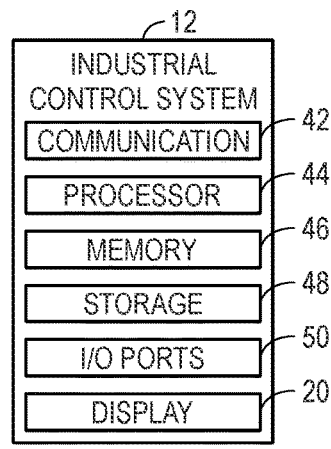
FIG. 2 is a block diagram of an example industrial control system, in accordance with an embodiment.

With the foregoing in mind, FIG. 2 is a block diagram of an example industrial control system 12 that may be used with the embodiments described herein. The industrial control system 12 may include a communication component 42, a processor 44, a memory 46, a storage 48, input/output (I/O) ports 50, a display 20, and the like. The communication component 42 may be a wireless or wired communication component that facilitates communication between the container orchestration system 24 and the industrial control system 12, or any other suitable electronic device. The processor 44 may be any type of computer processor or microprocessor capable of executing computer-executable code. The processor 44 may also include multiple processors that may perform the operations described below.

The memory 46 and the storage 48 may be any suitable article of manufacture that may serve as media to store processor-executable code, data, or the like. These articles of manufacture may represent computer-readable media (i.e., any suitable form of memory or storage) that may store the processor-executable code used by the processor 44 to perform the presently disclosed techniques. The memory 46 and the storage 48 may represent non-transitory computer-readable media (e.g., any suitable form of memory or storage) that may store the processor-executable code used by the processor 44 to perform various techniques described herein. It should be noted that non-transitory merely indicates that the media is tangible and not a signal.

The I/O ports 50 may couple to one or more sensors 18, one or more input devices, one or more displays, or the like to facilitate human or machine interaction with the industrial control system 12. For example, based on a notification provided to a user via a display 20, the user may use an input device to instruct the adjustment of an OT device.

The display 20, as discussed above, may operate to depict visualizations associated with software or executable code being processed by the processor 44. In one embodiment, the display 20 may be a touch display capable of receiving inputs from a user of the industrial control system 12. The display 20 may be any suitable type of display, such as a liquid crystal display (LCD), plasma display, or an organic light emitting diode (OLED) display, for example. Additionally, in one embodiment, the display 20 may be provided in conjunction with a touch-sensitive mechanism (e.g., a touch screen) that may function as part of a control interface for the industrial control system 12.

Although FIG. 2 is depicted with respect to the industrial control system 12, it should be noted that the container orchestration system 24, the container nodes 30, and the proxy node 32 may also include the same or similar components to perform, or facilitate performing, the various techniques described herein. Moreover, it should be understood that the components described with respect to FIG. 2 are exemplary figures and the industrial control system 12 and other suitable computing systems may include additional or fewer components as detailed above.

Figure 3:
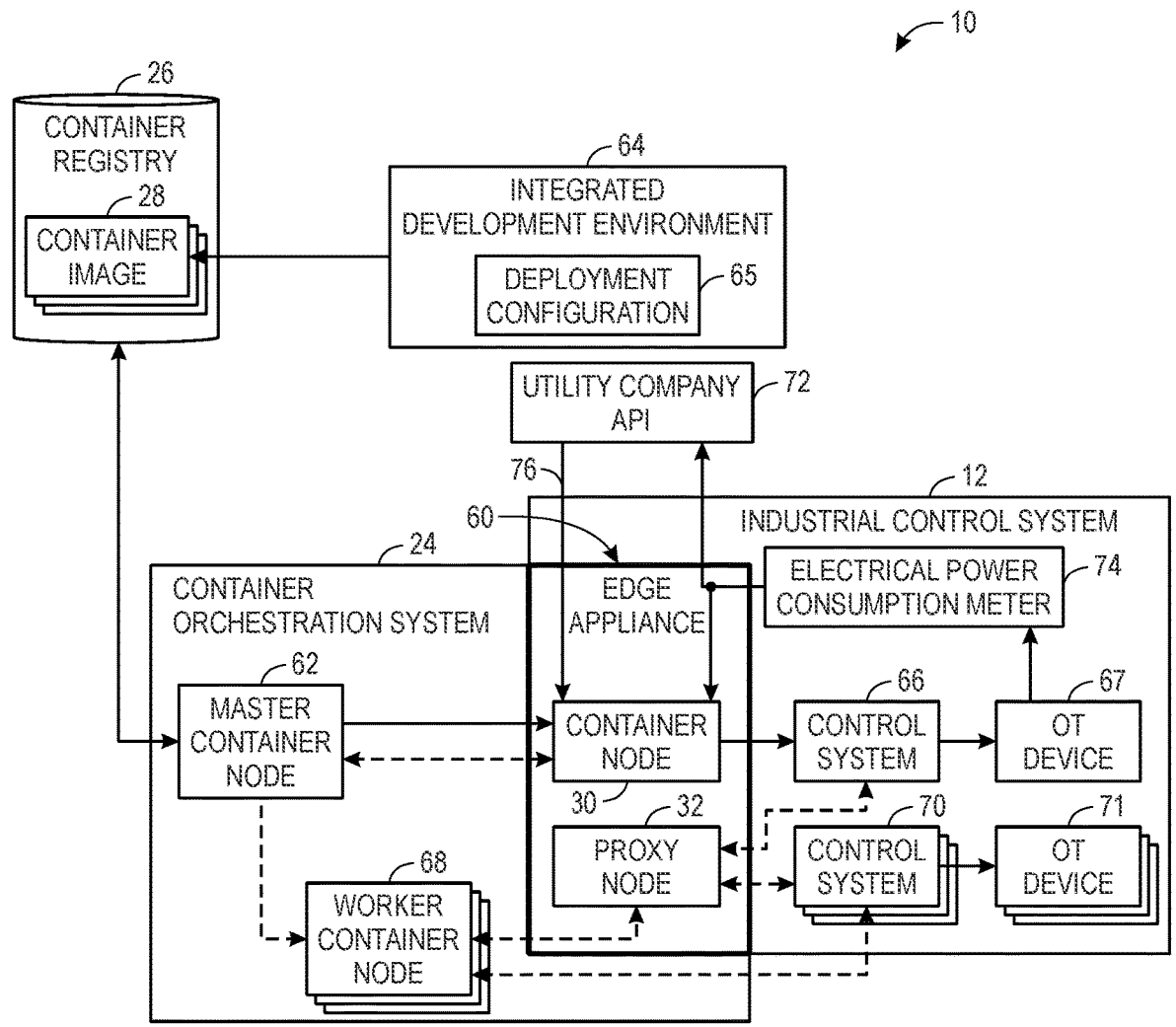
FIG. 3 is a block diagram of an example operational technology (OT) network that coordinates with a container orchestration system of an information technology (IT) network, in accordance with an embodiment.

With the foregoing in mind, FIG. 3 illustrates a block diagram of some embodiments of the industrial automation system 10 including an edge appliance 60 disposed between the container orchestration system 24 and the industrial control system 12. The edge appliance 60 may include the container node 30 and the proxy node 32 integrated between the container orchestration system 24 and the industrial control system 12. As such, the edge appliance 60 may provide visibility into operations of OT devices 67 (e.g., the sensors 18 and/or the stations 14 discussed above with respect to FIG. 1) to the container orchestration system 24 (e.g., the IT network).

As mentioned above, the container orchestration system 24 may include a collection of nodes that are used to achieve a desired state of one or more containers across multiple nodes. As shown in FIG. 3, the container orchestration system 24 may include a master node 62 that may execute control plane processes for the container orchestration system 24. The control plane processes may include the processes that enable the container orchestration system 24 to coordinate operations of the container nodes 30 to meet the desired states. As such, the master container node 62 may execute an applications programming interface (API) for the container orchestration system 24, a scheduler component, core resources controllers, and the like.

By way of example, the master container node 62 may coordinate all of the interactions between nodes of the cluster that make up the container orchestration system 24. Indeed, the master container node 62 may be responsible for deciding the operations that will run on container nodes 30 including scheduling workloads (e.g., containerized applications), managing the workloads' lifecycle, scaling, and upgrades, managing network and storage resources for the workloads, and the like. The master container node 62 may run an API server to handle requests and status updates received from the container nodes 30.

By way of operation, an integrated development environment (IDE) tool 64 may be used by an operator to develop a deployment configuration file 65. As mentioned above, the deployment configuration file 65 may include details regarding the containers, the pods, constraints for operating the containers/pods, and other information that describe a desired state of the containers specified in the deployment configuration file 65. In some embodiments, the deployment configuration file 65 may be generated in a YAML file, a JSON file, or other suitable file format that is compatible with the container orchestration system 24. After the IDE tool 64 generates the deployment configuration file 65, the IDE tool 64 may transmit the deployment configuration file 65 to the container registry 26, which may store the file along with container images 28 representative of the containers stored in the deployment configuration file 65.

In some embodiments, the master container node 62 may receive the deployment configuration file 65 via the container registry 26, directly from the IDE tool 64, or the like. The master container node 62 may use the deployment configuration file 65 to determine a location to gather the container images 28, determine communication protocols to use to establish networking between container nodes 30, determine locations for mounting storage volumes, locations to store logs for the containers, and the like.

Based on the desired state provided in the deployment configuration file 65, the master container node 62 may deploy containers to the container host nodes 30. That is, the master container node 62 may schedule the deployment of a container based on constraints (e.g., CPU or memory availability) provided in the deployment configuration file 65. After the containers are operating on the container nodes 30, the master container node 62 may manage the lifecycle of the containers to ensure that the containers specified by the deployment configuration file 65 is operating according to the specified constraints and the desired state.

Keeping the foregoing in mind, the industrial control system 12 may not use an operating system (OS) that is compatible with the container orchestration system 24. That is, the container orchestration system 24 may be configured to operate in the IT space that involves the flow of digital information. In contrast, the industrial control system 12 may operate in the OT space that involves managing the operation of physical processes and the machinery used to perform those processes. For example, the OT space may involve communications that are formatted according to OT communication protocols, such as FactoryTalk Live Data, EtherNet/IP, Common Industrial Protocol (CIP), OPC Direct Access (e.g., machine to machine communication protocol for industrial automation developed by the OPC Foundation), or any suitable OT communication protocol (e.g. DNP3, Modbus, Profibus, LonWorks, DALI, BACnet, KNX, EnOcean). Because the industrial control systems 12 operate in the OT space, the industrial control systems may not be capable of implementing IT commands received via the container orchestration system 24.

In certain embodiments, the container node 30 may be programmed or implemented in the industrial control system 12 to serve as a node agent that can register the industrial control system 12 with the master container node 62. For example, the industrial control system 12 may include a programmable logic controller (PLC) that may support an OT communication protocol or an operating system (e.g., Linux) for receiving and/or implementing OT commands indicating requested operations issued by the container orchestration system 24. However, the PLC may perform certain operations that may be mapped to certain container events. As such, the container node 30 may include software and/or hardware components that may map certain events or IT commands (e.g., software commands, software instructions) received from the master container node 62 to OT commands ( ) to cause the PLC to perform actions. For example, the container node 30 may generate the OT commands based on the IT commands.

After converting the received IT command into an OT command interpretable by the PLC, the container node 30 may forward the mapped OT command to the PLC that may implement the mapped OT command. As such, the container node 30 may operate as part of the cluster of nodes that make up the container orchestration system 24, while a control system 66 (e.g., PLC) may coordinate the OT operations for the OT devices 67 (e.g., the stations 14 and/or the sensors 18 shown in FIG. 1) in the industrial control system 12. The control system 66 may include a controller, such as a programmable logic controller (PLC), a programmable automation controller (PAC), or any other controller that may monitor, control, and operate an industrial automation device or component.

The industrial automation device or component may correspond to an OT device 67. The OT devices 67 may include any suitable industrial device that operates in the OT space such as the sensors 18 and/or the stations 14 shown in FIG. 1. As such, the OT devices 67 may be involved in adjusting physical processes being implemented via the industrial system 10. In some embodiments, the OT devices 67 may include motor control centers, motors, human machine interfaces (HMIs), operator interfaces, contactors, starters, sensors, drives, relays, protection devices, switchgear, compressors, network switches (e.g., Ethernet switches, modular-managed, fixed-managed, service-router, industrial, unmanaged, etc.) and the like. In addition, the OT devices 67 may also be related to various industrial equipment such as mixers, machine conveyors, tanks, skids, specialized original equipment manufacturer machines, and the like. The OT devices 67 may also be associated with devices used by the equipment such as scanners, gauges, valves, flow meters, and the like. In one embodiment, every aspect of the OT devices 67 may be controlled or operated by the control system 66.

In some embodiments, a utility company API 72 may be coupled to the industrial control system 12. For example, an electric power utility company may provide the utility company API 72 for communication with the industrial control system 12. In the depicted embodiment, the utility company API 72 may receive electrical power consumption of the depicted portion of the industrial automation system 10 (e.g., the OT devices 67) via an electrical power consumption meter 74. The electrical power consumption meter 74 may be coupled to the OT devices 67 to determine (e.g., measure, receive an indication of, etc.) the electrical power consumption of the depicted portion of the industrial automation system 10 (e.g., the OT devices 67). It should be appreciated that the electric power utility company is discussed herein as an example and in alternative or additional embodiments, any other viable external device may correspond to the electric power utility company. Similarly, the utility company API 72 may correspond to an API of any such external device.

In some cases, the electric power utility company may receive and/or measure the electrical power consumption of the portion of the industrial automation system 10 during specific time windows. For example, the electric power utility company may provide an indication to the container node 30, the master container node 62, or both indicative of a time window. For example, the time window may include a start time and/or a duration time. In particular, the utility company API 72 of the electric power utility company may provide a synchronization pulse 76 to the container node 30, the master container node 62, or both indicative of a start time of the time window.

In response to the synchronization pulse 76, the container node 30, the master container node 62, or both may perform one or more operations. In some embodiments, the container node 30 may provide OT commands to the control system 66 indicative of reducing electrical power consumption of one or more OT devices 67. For example, the container node 30 may provide an indication of the synchronization pulse 76 to an indicative device (e.g., the display 20 shown in FIG. 1) and provide the OT commands based on receiving a user response to the indication. Alternatively or additionally, the container node 30 may provide the OT commands directly in response to receiving the synchronization pulse 76.

In alternative or additional embodiments, the master container node 62 may provide IT commands to the container node 30 indicative of reducing electrical power consumption of one or more OT devices 67. For example, the master container node 62 may provide an indication of the synchronization pulse 76 to an indicative device (e.g., the display 20 shown in FIG. 1) and provide the IT commands based on receiving a user response (e.g., via the integrated development environment 64) to the indication. Alternatively or additionally, the master container node 62 may provide the IT commands directly in response to receiving the synchronization pulse 76. In any case, the master container node 62 receive and/or retrieve the IT commands from the container images 28 of the container registry 26.

In some embodiments, the container node 30 may be associated with the industrial automation line 11 (of FIG. 1 discussed above) including the OT devices 67 (e.g., the stations 14 and/or the sensors 18 shown in FIG. 1). Alternatively or additionally, the container node 30 may be associated with multiple industrial automation lines 11 each including one or multiple OT devices 67. Moreover, in additional or different embodiments, the container orchestration system 24 may be coupled to additional container nodes 30 associated with additional industrial automation lines 11, as will be appreciated.

In the present embodiments described herein, the control system 66 may thus perform actions based on the OT commands received from the container node 30. By mapping certain container lifecycle states into appropriate corresponding actions implementable by the control system 66, the container node 30 enables program content for the industrial control system 12 to be containerized, published to certain registries, and deployed using the master container node 62, thereby bridging the gap between the IT-based container orchestrations system 24 and the OT-based industrial control system 12.

Figure 4:
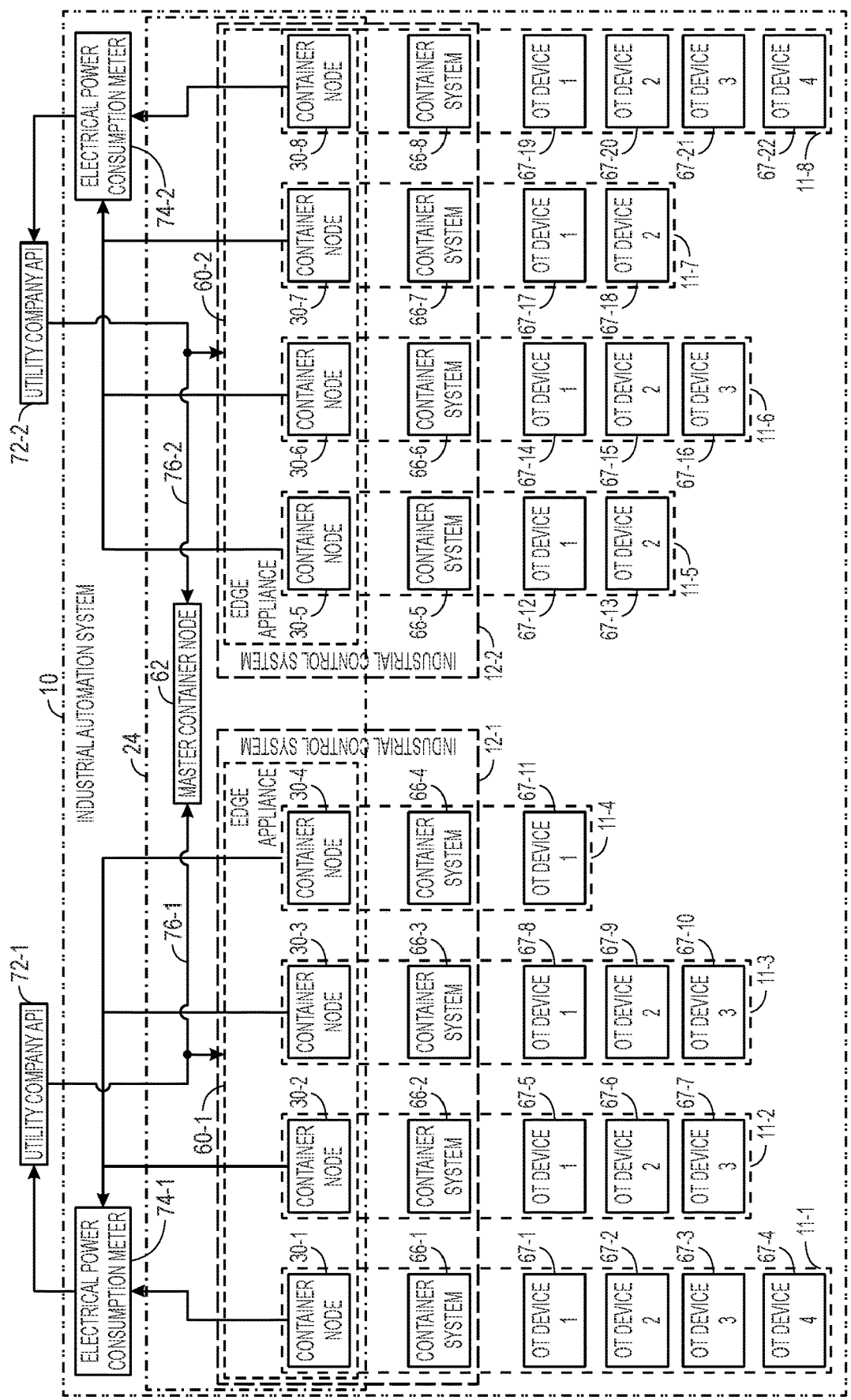
FIG. 4 is a block diagram of the industrial automation system 10 including multiple industrial automation lines controlled by the container orchestration system, in accordance with an embodiment.

FIG. 4 illustrate a block diagram of some embodiments of the industrial automation system 10 including multiple industrial automation lines 11 controlled by the container orchestration system 24. In particular, the industrial automation system 10 may include the container orchestration system 24 (e.g., a portion of the IT network) coupled to and/or controlling OT devices 67 of the industrial automation lines 11-1, 11-2, 11-3, 11-4, 11-5, 11-6, 11-7, and 11-8 (e.g., the OT network). It should be appreciated that in different embodiments, each of the industrial automation lines 11-1, 11-2, 11-3, 11-4, 11-5, 11-6, 11-7, and 11-8 may include different number of OT devices 67 and/or may be disposed at different geographical locations. Moreover, in different embodiments, the container orchestration system 24 may be coupled to and/or control OT devices 67 of a different number of industrial automation lines 11.

The container orchestration system 24 may include the master container node 62, a first edge appliance 60-1, and a second edge appliance 60-2. The first edge appliance 60-1 may include the container nodes 30-1, 30-2, 30-3, and 30-4. Moreover, the second edge appliance 60-2 may include the container nodes 30-5, 30-6, 30-7, and 30-8.

A first industrial control system 12-1 may include the first edge appliance 60-1 and control systems 66-1, 66-2, 66-3, and 66-4. In the depicted embodiment, the container node 30-1 may be coupled to the control system 66-1 which in turn is coupled to OT devices 67-1, 67-2, 67-3, and 67-4. The industrial automation line 11-1 may include the OT devices 67-1, 67-2, 67-3, and 67-4. The container node 30-2 may be coupled to the control system 66-2 which in turn is coupled to OT devices 67-5, 67-6, and 67-7. The industrial automation line 11-2 may include the OT devices 67-5, 67-6, and 67-7. The container node 30-3 may be coupled to the control system 66-3 which in turn is coupled to OT devices 67-8, 67-9, and 67-10. The industrial automation line 11-3 may include the OT devices 67-8, 67-9, and 67-10. The container node 30-4 may be coupled to the control system 66-4 which in turn is coupled to OT device 67-11. The industrial automation line 11-4 may include the OT device 67-11.

A second industrial control system 12-2 may include the second edge appliance 60-2 and control systems 66-5, 66-6, 66-7, and 66-8. The container node 30-5 may be coupled to the control system 66-5 which in turn is coupled to OT devices 67-12 and 67-13. The industrial automation line 11-5 may include the OT devices 67-12 and 67-13. The container node 30-6 may be coupled to the control system 66-6 which in turn is coupled to OT devices 67-14, 67-15, and 67-16. The industrial automation line 11-6 may include the OT devices 67-14, 67-15, and 67-16. The container node 30-7 may be coupled to the control system 66-7 which in turn is coupled to OT devices 67-17 and 67-18. The industrial automation line 11-7 may include the OT devices 67-17 and 67-18. The container node 30-8 may be coupled to the control system 66-8 which in turn is coupled to OT devices 67-19, 67-20, 67-21, and 67-22. The industrial automation line 11-8 may include the OT devices 67-19, 67-20, 67-21, and 67-22.

In some embodiments, a first factory may include the industrial automation lines 11-1, 11-2, 11-3, and 11-4. Moreover, a second factory may include the industrial automation lines 11-5, 11-6, 11-7, and 11-8. In different embodiments, the first factory and the second factory may be located at different geographical locations.

In any case, the OT network may include the first factory and the second factory. Moreover, the IT network may include the container orchestration system 24 providing IT commands to the OT devices 67 of the OT network. In some cases, the IT network may also include an integrated development environment (e.g., the integrated development environment 64 of FIG. 3) and/or a container registry (e.g., the container registry 26 of FIG. 3) not shown for simplicity.

The container nodes 30-1, 30-2, 30-3, 30-4, 30-5, 30-6, 30-7, and 30-8 of the edge appliances 60-1 and 60-2 may generate OT commands based on receiving the IT commands. Moreover, the container nodes 30-1, 30-2, 30-3, 30-4, 30-5, 30-6, 30-7, and 30-8 may provide the OT commands to the respective control systems 66-1, 66-2, 66-3, 66-4, 66-5, 66-6, 66-7, and 66-8 of the targeted OT devices 67. The targeted OT devices 67 may perform one or more functions based on receiving the OT commands.

With the foregoing in mind, the industrial automation system 10 may include a first electrical power consumption meter 74-1 associated with the industrial automation lines 11-1, 11-2, 11-3, and 11-4 of the first factory. The industrial automation system 10 may include a second electrical power consumption meter 74-2 associated with the industrial automation lines 11-5, 11-6, 11-7, and 11-8 of the second factory. In some embodiments, the first industrial control system 12-1 may include the first electrical power consumption meter 74-1 and/or the second industrial control system 12-2 may include the second electrical power consumption meter 74-2. In alternative or additional embodiments, the first electrical power consumption meter 74-1 and/or the second electrical power consumption meter 74-2 may be disposed at any other viable location.

Moreover, a first electric power utility company may provide electrical power to the industrial automation lines 11-1, 11-2, 11-3, and 11-4 of the first factory. For example, the first electric power utility company may include and/or provide a first utility company API 72-1 for communication with the industrial automation lines 11-1, 11-2, 11-3, and 11-4. Moreover, a second electric power utility company may provide electrical power to the industrial automation lines 11-5, 11-6, 11-7, and 11-8 of the second factory. The second electric power utility company may provide a second utility company API 72-2 for communication with the industrial automation lines 11-5, 11-6, 11-7, and 11-8.

The first utility company API 72-1 may be coupled to the first electrical power consumption meter 74-1. The first utility company API 72-1 may receive electrical power consumption of the OT devices 67 of the industrial automation lines 11-1, 11-2, 11-3, and 11-4. The first electrical power consumption meter 74-1 may be coupled to the OT devices 67 of the industrial automation lines 11-1, 11-2, 11-3, and 11-4 to determine (e.g., measure, receive an indication of, etc.) the electrical power consumption of the first factory.

In some cases, the first electric power utility company may receive and/or measure the electrical power consumption (e.g., electrical power demand) of the first factory during specific time windows (e.g., demand windows). For example, the first electric power utility company may provide an indication of a time window to the container nodes 30-1, 30-2, 30-3, and 30-4, the master container node 62, or a combination thereof. In particular, the first utility company API 72-1 of the first electric power utility company may provide a first synchronization pulse 76-1 to the container nodes 30-1, 30-2, 30-3, and 30-4, the master container node 62, or a combination thereof indicative of a start time of the time window.

In response to the first synchronization pulse 76-1, one or more of the container nodes 30-1, 30-2, 30-3, and 30-4, and/or the master container node 62 may perform one or more operations. For example, the container nodes 30-1, 30-2, 30-3, and 30-4, and/or the master container node 62 may deploy workloads (e.g., containerized applications) to perform the one or more operations. In some embodiments, the container nodes 30-1, 30-2, 30-3, and/or 30-4 may provide OT commands to the respective control systems 66-1, 66-2, 66-3, and/or 66-4 indicative of reducing electrical power consumption of one or more OT devices 67. Alternatively or additionally, one or more of the container nodes 30-1, 30-2, 30-3, and/or 30-4 may provide one or more of the OT commands directly in response to receiving the first synchronization pulse 76-1.

The OT commands may indicate switching operation modes of targeted OT devices 67 of the first factory during the time window. For example, switching the operation modes of the targeted OT devices 67 may include performing energy management functions such as switching an electrical power source of one or more OT devices 67 to alternative sources (e.g., renewable energy sources), switching operations of the one or more OT devices 67 to a low-power mode, standby mode, or power off mode, among other things. Accordingly, the OT commands may reduce the electrical power consumption of the first factory and/or the industrial automation system 10 during the time window.

In alternative or additional embodiments, the master container node 62 may provide IT commands to the container nodes 30-1, 30-2, 30-3, and/or 30-4. The IT commands may be indicative of reducing electrical power consumption of one or more of the respective OT devices 67. In some cases, the master container node 62 may provide an indication of the first synchronization pulse 76-1 via an indicative device (e.g., via the display 20 shown in FIG. 1). In such cases, the master container node 62 may provide the IT commands based on receiving a user response (e.g., via the integrated development environment 64) to the indication. Alternatively or additionally, the master container node 62 may provide the IT commands directly in response to receiving the first synchronization pulse 76-1. For example, the master container node 62 receive and/or retrieve the IT commands from the container images 28 of the container registry 26.

The second utility company API 72-2 may be coupled to the second electrical power consumption meter 74-2. The second utility company API 72-2 may receive electrical power consumption of the OT devices 67 of the industrial automation lines 11-5, 11-6, 11-7, and 11-8. The second electrical power consumption meter 74-2 may be coupled to the OT devices 67 of the industrial automation lines 11-5, 11-6, 11-7, and 11-8 to determine (e.g., measure, receive an indication of, etc.) the electrical power consumption of the second factory.

In some cases, the second electric power utility company may receive and/or measure the electrical power consumption (e.g., electrical power demand) of the first factory during specific time windows. For example, the second electric power utility company may provide an indication of a time window to the container nodes 30-5, 30-6, 30-7, and 30-8, the master container node 62, or a combination thereof. In particular, the second utility company API 72-2 of the second electric power utility company may provide a second synchronization pulse 76-2 to the container nodes 30-5, 30-6, 30-7, and 30-8, the master container node 62, or a combination thereof indicative of a start time of the time window. It should be appreciated that in different embodiments, the second electric power utility company may include the first electric power utility company or may be a different electric power utility company located at a different geographical location.

In response to the second synchronization pulse 76-2, one or more of the container nodes 30-5, 30-6, 30-7, and 30-8, and/or the master container node 62 may perform one or more operations. For example, the container nodes 30-5, 30-6, 30-7, and 30-8, and/or the master container node 62 may deploy workloads (e.g., containerized applications) to perform the one or more operations. In some embodiments, the container nodes 30-5, 30-6, 30-7, and/or 30-8 may provide OT commands to the respective control systems 66-5, 66-6, 66-7, and/or 66-8 indicative of reducing electrical power consumption of one or more OT devices 67. Alternatively or additionally, one or more of the container nodes 30-5, 30-6, 30-7, and 30-8 may provide one or more of the OT commands directly in response to receiving the second synchronization pulse 76-2.

Similar to the OT commands of the first factory mentioned above, the OT commands of the second factory may indicate switching operation modes of targeted OT devices 67 of the second factory during the time window. For example, switching the operation modes of the targeted OT devices 67 may include switching an electrical power source of one or more OT devices 67 to alternative sources (e.g., renewable energy sources), switching operations of the one or more OT devices 67 to a low-power mode, standby mode, or power off mode, among other possible operation modes. Accordingly, the OT commands may reduce the electrical power consumption of the first factory and/or the industrial automation system 10 during the time window.

In alternative or additional embodiments, the master container node 62 may provide IT commands to the container nodes 30-5, 30-6, 30-7, and/or 30-8. The IT commands may be indicative of reducing electrical power consumption of one or more of the respective OT devices 67. In some cases, the master container node 62 may provide an indication of the second synchronization pulse 76-2 via an indicative device (e.g., via the display 20 shown in FIG. 1). In such cases, the master container node 62 may provide the IT commands based on receiving a user response (e.g., via the integrated development environment 64) to the indication. Alternatively or additionally, the master container node 62 may provide the IT commands directly in response to receiving the second synchronization pulse 76-2. For example, the master container node 62 receive and/or retrieve the IT commands from the container images 28 of the container registry 26.

In any case, the OT network may include the first factory and the second factory. Moreover, the IT network may include the container orchestration system 24 providing IT commands targeted for one or more of the OT devices 67 of the OT network. The container nodes 30-1, 30-2, 30-3, 30-4, 30-5, 30-6, 30-7, and 30-8 of the edge appliances 60-1 and 60-2 may generate OT commands based on receiving the IT commands. Moreover, the container nodes 30-1, 30-2, 30-3, 30-4, 30-5, 30-6, 30-7, and 30-8 may provide the OT commands to the respective control systems 66-1, 66-2, 66-3, 66-4, 66-5, 66-6, 66-7, and 66-8 of the targeted OT devices 67. The targeted OT devices 67 may perform one or more functions based on receiving the OT commands.

Figure 5:
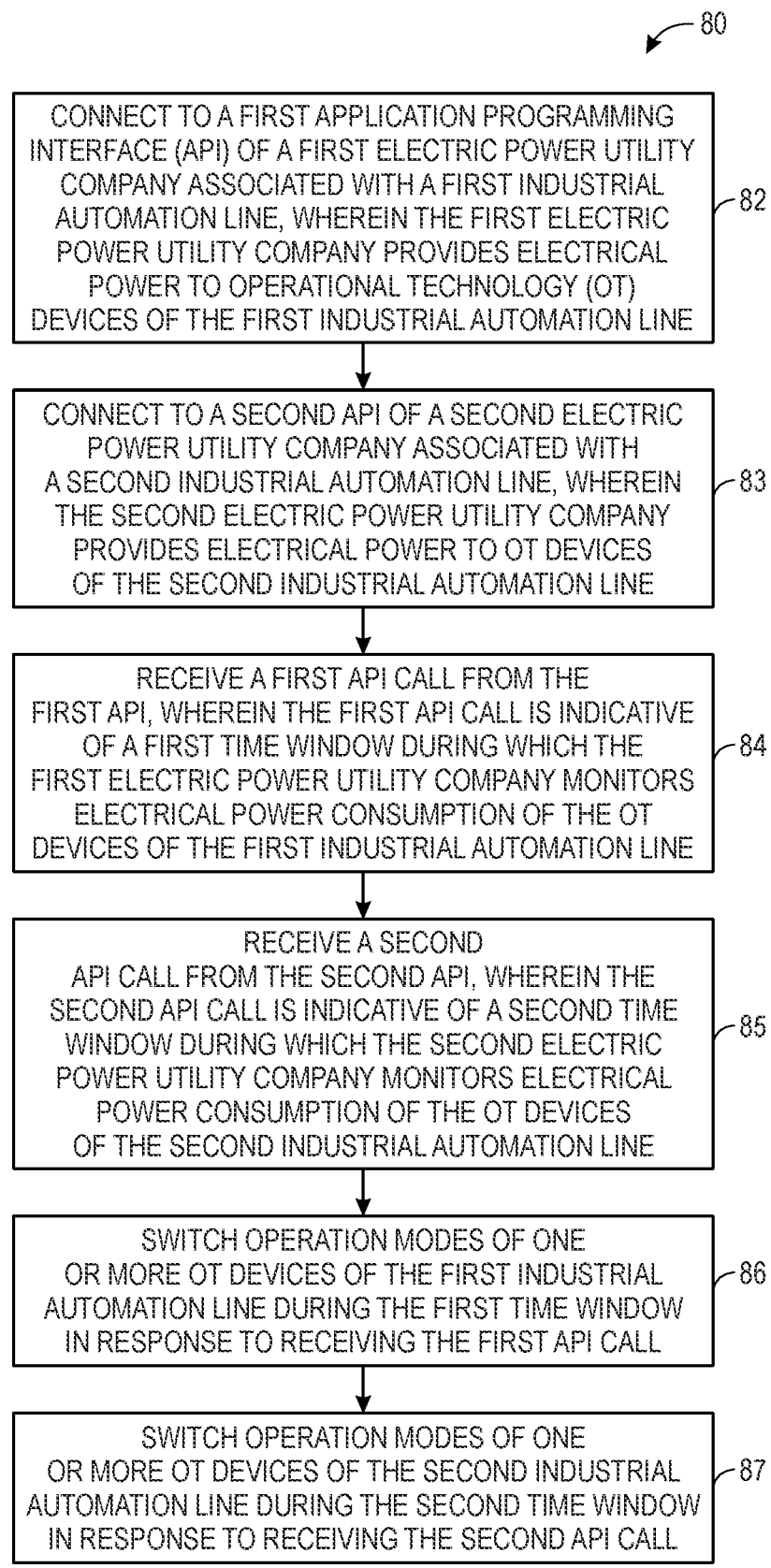
FIG. 5 is a flow chart of a method for reducing electrical power consumption of a factory by a container orchestration system of the IT network when an electric power utility company monitors electrical power consumption of the factory, in accordance with an embodiment.

FIG. 5 illustrates a method 80 in which the container orchestration system 24 adjusts electrical power consumption of a factory in response to the electric power utility company monitoring electrical power consumption of the factory. In one example, the container orchestration system 24 of the IT network may perform the operations of method 80 to reduce the electrical power consumption of the OT network during the demand windows of the electric power utility company to more accurately represent the average electrical power consumption of the industrial system. As described above, the container orchestration system 24 may include the master container node 62 and one or more edge appliances 60, each including a number of the container nodes 30. As such, in different cases, the master container node 62 or one or more of the container nodes 30 may perform the operations of method 80 discussed herein. Although the blocks of the method 80 are described in a particular order, it should be appreciated that the blocks may be performed in any viable order. Moreover, it should be appreciated that the container orchestration system 24 may perform additional or reduced blocks.

At block 82, the container orchestration system 24 may connect to a first API of a first electric power utility company associated with a first industrial automation line. The first electric power utility company may provide electrical power to OT devices 67 of the first industrial automation line. For example, the first industrial automation line may correspond to one of the industrial automation lines 11-1, 11-2, 11-3, or 11-4 shown in FIG. 4 and discussed above. Moreover, the first API may correspond to the first utility company API 72-1 of FIGS. 3 and 4 discussed above.

At block 83, the container orchestration system 24 may connect to a second API of a second utility company associated with a second industrial automation line. The second electric power utility company may provide electrical power to OT devices 67 of the second industrial automation line. In some cases, the second industrial automation line may correspond to one of the industrial automation lines 11-5, 11-6, 11-7, or 11-8 shown in FIG. 4 and discussed above. Moreover, the second API may correspond to the second utility company API 72-2 of FIGS. 3 and 4 discussed above. It should be appreciated that the first industrial automation line and the second industrial automation line may be located at different factories and/or at different geographical locations.

At block 84, the container orchestration system 24 may receive a first API call from the first API. The first API call may indicate a first time window during which the first electric power utility company may monitor electrical power consumption (e.g., demand) of the OT devices 67 of the first industrial automation line. In some cases, the first API call may correspond to the synchronization pulse 76 discussed above with respect to FIG. 3 or the first synchronization pulse 76-1 discussed above with respect to FIGS. 3 and 4.

At block 85, the container orchestration system 24 may receive a second API call from the second API. The second API call may indicate a second time window during which the first electric power utility company may monitor electrical power consumption (e.g., demand) of the OT devices 67 of the second industrial automation line. In some cases, the second API call may correspond to the synchronization pulse 76 discussed above with respect to FIG. 3 or the second synchronization pulse 76-2 discussed above with respect to FIGS. 3 and 4.

At block 86, the container orchestration system 24 may switch operation modes of one or more OT devices 67 (e.g., the targeted OT devices 67) of the first industrial automation line during the first time window in response to receiving the first API call. Moreover, at block 87, the container orchestration system 24 may switch operation modes of one or more OT devices 67 of the second industrial automation line during the second time window in response to receiving the second API call. For example, switching the operation modes of the OT devices 67 may include switching an electrical power source of one or more OT devices 67 to alternative sources (e.g., renewable energy sources), switching operations of the one or more OT devices 67 to a low-power mode, standby mode, or power off mode, among other possible operation modes.

By performing the method 80, the container orchestration system 24 may adjust the electrical energy being consumed by the respective OT devices 67 to achieve multiple purposes. For example, if the monitoring time period is expected to be performed during a time period that inaccurately reflects the average energy consumption of the respective OT devices 67, the container orchestration system 24 may adjust the operations of the OT devices 67 during the monitoring time period to perform operations that consume the average energy consumption of the OT devices 67. In some embodiments, the container orchestration system 24 may adjust the operations of the OT devices 67 to reflect a minimal or the least amount of energy consumed by the OT devices 67 during the course of operations performed by the OT devices 67 to minimize energy costs. In any case, the embodiments described herein may enable the container orchestration system 24 to control the utility company's view of the energy consumption of the organization.

Figure 6:
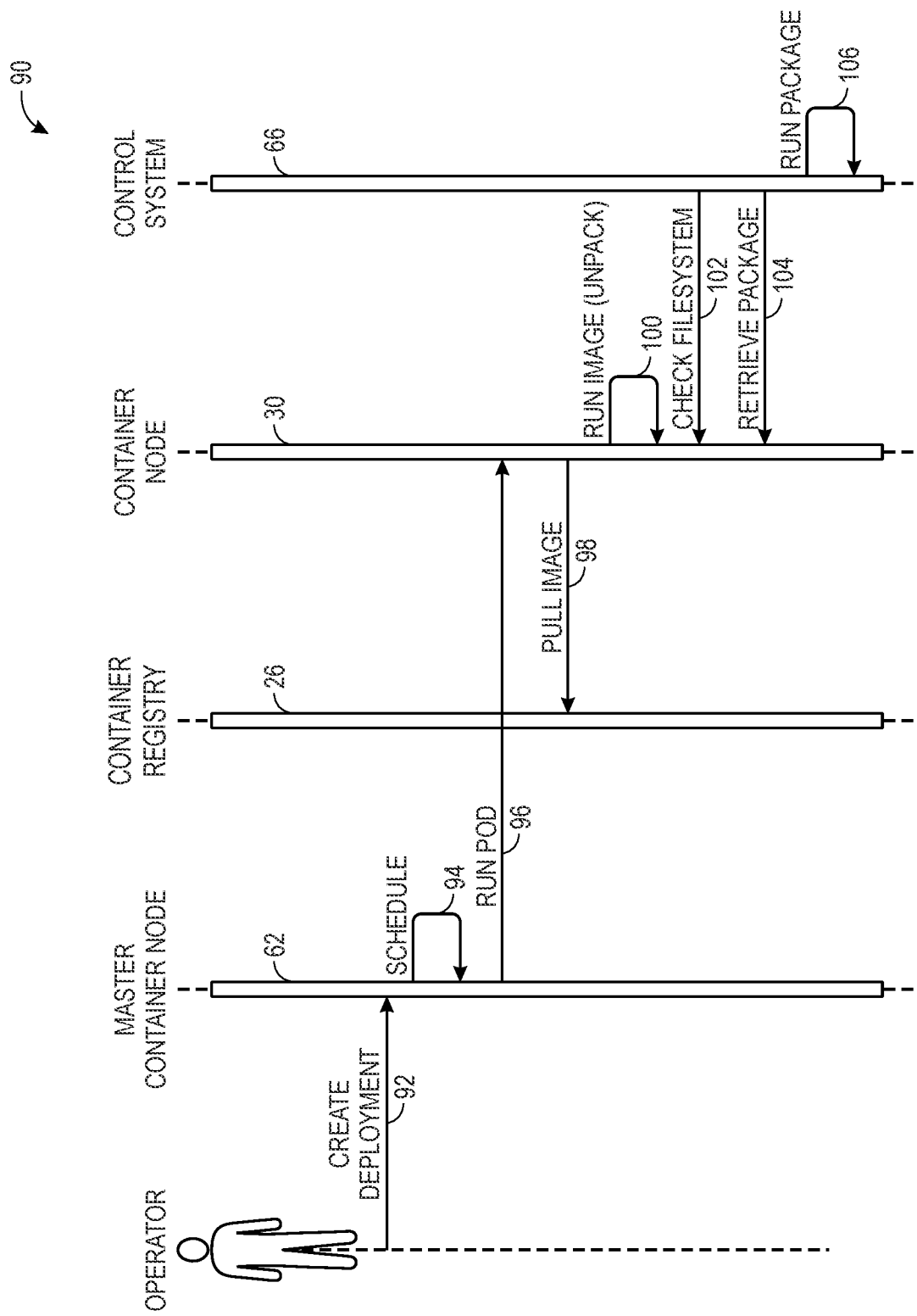
FIG. 6 is a data flow diagram illustrating the deployment of container pods to industrial control systems in the OT network of FIG. 3, in accordance with an embodiment.
Figure 7:
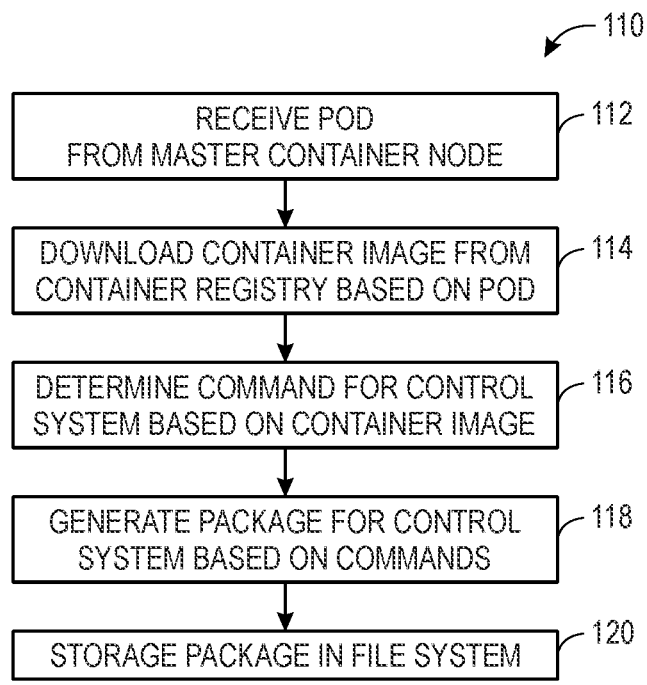
FIG. 7 is a flow chart of a method for the industrial control system passively implementing commands received via the control orchestration system, in accordance with an embodiment.
Figure 8:
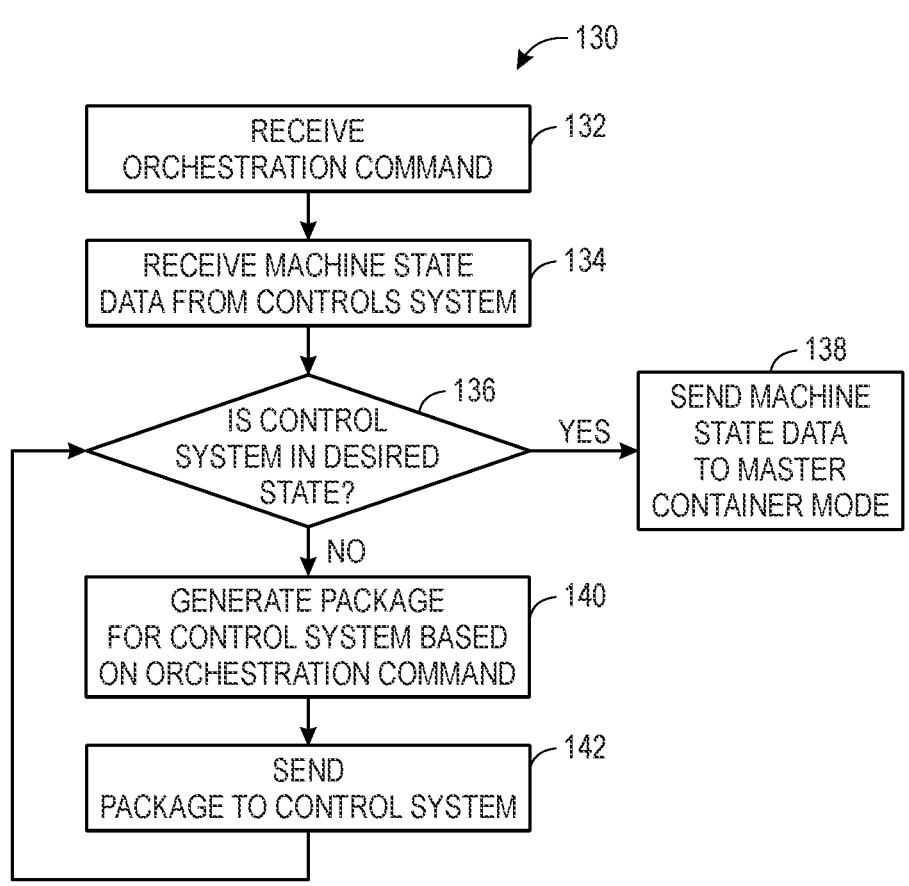
FIG. 8 is a flow chart of a method for the industrial control system actively implementing commands received via the control orchestration system, in accordance with an embodiment.

With the forgoing in mind, FIGS. 6-8 illustrate a data flow diagram and methods for operating the container orchestration system 24 to control functions of the OT network. For example, the data flow diagram and methods of FIGS. 6-8 described below may be used to reduce electrical power consumption of the OT devices 67 of the OT network during the demand windows of one or more utility companies by the IT network.

FIG. 6 illustrates a data flow diagram 90 that tracks the deployment of a container using the master container node 62 and the container node 30 described above with reference to FIG. 3. At step 92, the IDE tool 64 may create a deployment of the deployment configuration file 65 to the master container node 62. After receiving the deployment configuration file 65, the master container node 62 may identify a container node 30 that may fit the constraint specifications (e.g., memory, CPU availability) provided in the deployment configuration file 65. That is, the master container node 62 performs scheduling operations that involve checking the state data for each node of the container orchestration system 24, determining whether a suitable node exists for the constraints provided in the deployment configuration file 65, and the like.

After identifying the suitable container node, at step 94, the master container node 62 may schedule the deployment of the container to the respective container node 30. At step 96, the master container node 62 may deploy a pod to the container node 30, which may cause the container node 30 to retrieve a container image 28 from the container registry 26 at step 98. In this way, the container node 30 is configured to receive pods from the master container node 62 and execute the pods, although the control system 66 of the industrial control system 12 may not be able to execute the pod. After pulling the container image 28 from the container registry 26, the container node 30 may, at step 100, run the container image 28 or unpack the container image 28 and store an application or operation executable by the control system 66 in a file system. At step 102, the control system 66 may check the file system of the container node 30 for updates or newly stored packages. At step 104, the control system 66 may retrieve the stored package that may include the container scheduled for operation by the control system 66 by the master container node 62 at step 94. At step 106, the control system 66 may execute the package retrieved from the file system of the container node 30. The container node 30 may then monitor the operations of the package being executed on the control system 66, the state (e.g., memory, CPU usage) of the control system 66 and send updates to the master container node 62. If the container node 30 sends an update indicative of the package no longer executing the package, the master container node 62 may schedule deployment of another pod to another container node 30 for execution to maintain the desired state.

Keeping the foregoing in mind, FIG. 7 illustrates a method 110 in which the container node 30 may implement to coordinate activities via the master container node 62 of the container orchestration system 24. Although the following description of the method 110 is described as being performed by the container node 30, it should be understood that any suitable container node that is configured to interface with the cluster of nodes of the container orchestration system 24 and the industrial control system 12 may perform the operations described herein. In addition, although the method 110 is described in particular order, it should be understood that the method 110 may be performed in any suitable order.

Referring now to FIG. 7, at block 112, the container node 30 may receive a pod from the master container node 62. As mentioned above, pods may include one or more containers that are deployed to a host (e.g., container node 30). In some embodiments, the pod may operate to specify coordinated operations between a group of containers. The pod may include an indication or reference to a storage location for one or more container images 28 related to the pod. In some embodiments, the container images 28 may be stored in the container registry 26. As such, the pod may provide an indication of a network address or other address for accessing a memory location in the container registry 26.

After receiving the pod from the master container node 62, at block 114, the container node 30 may download the related container images 28 from the container registry 26. The container image 28, as mentioned above, represents data that encapsulates an application and its software dependencies. The container images 28 may be executable software bundles that may execute as standalone software without regard to the operating system that the corresponding container node 30 is using. In some embodiments, the container node 30 may receive the container images directly from the container registry 26, via the master container node 62, or any other suitable communication schemes.

After receiving the container images 28, at block 116, the container node 30 may run or unpack the container images 28, including the IT commands, and determine the OT commands that may be performed by the control system 66 based on the container images 28. That is, the container images 28 may include software applications that are executable by container nodes 30. However, the software applications may not be executable by the control system 66. As such, the container node 30 may determine (e.g., generate) OT commands for the control system 66 that correspond to the software applications encapsulated in the container images 28 (the IT commands). The OT commands may include commands generated based on OT communication protocols. For example, the OT commands may include various hardware descriptions language and/or software used by the OT devices 67 discussed above. In some embodiments, certain operations in the software applications may be mapped to certain operations that may be performed by the control system 66. For example, software application commands (e.g., IT commands) for create, run, start, pause, stop, and delete may map to download, download/run, run, idle, and unload commands, respectively, which may be performed by the control system 66.

After determining the OT commands that may be implemented by the control system 66 based on the container images 28, at block 118, the container node 30 may generate a package that may be retrieved and executed by the control system 66. That is, the container node 30 may organize or structure the determined OT commands into a software package that may be used by the control system 66. For example, if the control system 66 corresponds to a PLC, the package may be organized according to a programming structure (e.g. ladder logic) that the PLC may use to program itself.

At block 120, the container node 30 may store the package in a memory or filesystem that is accessible to the control system 66. In some embodiments, the container node 30 may not be capable of interfacing directly with the control system 66. However, the container node 30 may provide the control system 66 with access to its memory or storage components, such that the control system 66 may retrieve the stored package. The control system 66 may be programmed to periodically (e.g., daily, hourly) check the filesystem for updates or new packages available for downloading.

It should be noted that the method 110 may describe a passive-indirect mode of operation for the container node 30 as part of the container orchestration system 24. That is, the container node 30 is limited to performing a subset of IT commands that may be provided by the master container node 62, as opposed to performing all of the IT commands that nodes that are part of the container orchestration system 24 are capable of performing. Moreover, the container node 30 may not be able to perform all of the lifecycle operations provided in a container. For example, the container node 30 may facilitate a package download operation for the control system 66, as described above, but it may not be able to perform every function specified in the container if the control system 66 does not have a corresponding operation that can be mapped to the respective container lifecycle operation.

In some embodiments, the container node 30 may operate in a passive-direct mode of operation in which the container node 30 may participate as a node in the container orchestration system 24. As such, the container node 30 may support a full set of container lifecycle operations. That is, since the control system 66 may be capable of implementing a limited set of IT commands provided by the master container node 62, the container node 30 may be implemented or executed by a sidecar compute module that may host a container host daemon that may perform the full suite of operations that a node in the container orchestration system 24 may perform. As such, the sidecar compute module may be any suitable computing system that is capable of executing an operating system (OS), such that IT commands received from the master container node 62 may be implemented by the respective sidecar compute module.

By implementing the container node 30 in the sidecar compute module, the container node 30 may be operating as a node that is part of the container orchestration system 24 but operating in the OT space. As a result, the container node 30 may provide (e.g., extend) energy management functions available via the container orchestration system 24 to OT devices 67 that are not typically visible to the master container node 62 of the container orchestration system 24. To operate in the passive-direct mode, the container node 30 may include applications and/or APIs that interface directly with the control system 66 and the master container node 62. As such, the container node 30 may provide a bi-directional bridge of communication between the control system 66 and the master container node 62. In some embodiments, the container node 30 may include an API that translates the OT data received from the control system 66 into IT data that may be interpretable by the master container node 62. As such, the container node 30 may provide the master container node 62 with visibility into the operations and states of the OT devices 67 operating in the OT space.

With this in mind, FIG. 8 illustrates a method 130 for the container node 30 directly sending packages to the control system 66 and machine state data to the master container node 62 in accordance with embodiments described herein. Like the method 110 described above, the following description of the method 130 may be performed by any suitable computing system and any suitable order. It should be noted that the method 130 described below corresponds to operating the container node 30 in the passive-direct mode of operation. As such, the container node 30 may receive and interpret orchestration commands (e.g., IT commands) received from the master container node 62 or the like and directly interface with the control system 66 to verify that the control system 66 is operating at the desired state.

Referring to FIG. 8, at block 132, the container node 30 may receive an orchestration command (e.g., IT command) from the master container node 62 or some other node that is part of the container orchestration system 24. The orchestration command may include an instruction regarding one or more containers that the control system 66 should currently be executing. As such, the orchestration command may be part of a monitor function that causes the container node 30 to verify that the machine state data of the control system 66 corresponds to an expected machine state, as specified by the deployment configuration file 65.

At block 134, the container node 30 may retrieve machine state data from the control system 66. The machine state data may include current operational state (e.g., active, inactive) of the respective OT device controlled by the control system 66, available processing resources (e.g., CPU availability), available memory resources (e.g., storage, RAM), and the like. The machine state data may also indicate whether any containers are being executed by the control system 66. As such, the machine state data may be reported back to the master container node 62 to ensure that the desired state specified by the deployment configuration file 65 is present.

To receive the machine state data, the container node 30 may send requests to the control system 66 via an appropriate OT communication protocol. In response to receiving the requests, the control system 66 may query a database, memory cell, or other suitable storage that may include information regarding the requested data. After retrieving the requested information, the control system 66 may send the requested data to the container node 30 using the same OT communication protocol on which it received the request.

In some embodiments, the container node 30 may be embedded or integrated into one or more cores of the control system 66. As such, the container node 30 may communicate data with portions of the control system 66 using onboard communication methodologies. Alternatively, the container node 30 may directly retrieve the machine state data from the respective memory locations.

After receiving the machine state data from the control system 66, the container node 30 may, at block 136, determine whether the control system 66 is operating at a desired state based on the deployment configuration file 65. In the present embodiment, the container node 30 may evaluate whether the control system 66 is executing the containers, as specified in the deployment configuration file 65. That is, since the container node 30 may execute the container daemon host, the container node 30 may participate in the management of the containers distributed throughout the container orchestration system 24 by monitoring the machine state data of the control system 66.

If the control system 66 is operating in the desired state, the container node 30 may proceed to block 138 and send the machine state data to the master container node 62. The master container node 62 may then check whether other container nodes 30 are achieving the desire states.

If, however, the container node 30 determines that the control system 66 is not operating in the desired state, the container node 30 may proceed to block 140 and generate a package that may cause the control system 66 to modify its operations to execute the corresponding pod and the containers therein. After generating the package, the container node 30 may send the package directly to the control system 66 to execute. In this way, the container node 30 operates in the passive-direct mode because the container node 30 may directly send commands that cause the control system 66 to change operations. For example, instead of the control system 66 periodically checking the filesystem, as described above with respect to FIG. 7 (e.g., passive-indirect mode), the control system 66 may directly interface with the container node 30 and receive commands that may cause it to adjust operations of a connected device (e.g., OT device), execute received packages, and the like. As such, the container node 30 may push packages, firmware updates, OT device credential updates, security updates, encryption keys, and other data to the control system 66 at any given time. That is, the container system 30 may generate an event notification that causes an API or other component of the control system 66 to react in response to detecting the event notification. In this way, the container node 30 may actively participate in the coordination of containers with a respective control system 66 based on orchestration commands received passively from the master container node 62 or the like.

By employing the container nodes 30 to enable the container orchestration system 24 to implement software containers on control systems 66, the present embodiments described herein may allow for coordinating control of a number of control systems 66 and a number of OT devices 67 to control operations in the industrial automation system 10. That is, desired machine states may include desired operating parameters for industrial equipment, and the container orchestration system 24 may monitor the available industrial equipment resources to ensure that the desired machine states are continuously being achieved by coordinating activities via the container nodes 30 communicatively coupled to the control systems 66.

In addition to operating in the passive-indirect mode and the passive-direct mode, the container node 30 may operate in an active mode, such that the container node may invoke container orchestration commands for other container nodes 30. For example, referring back to FIG. 3, a proxy node 32 may operate as a proxy or gateway node that is part of the container orchestration system 24. The proxy node 32 may be implemented in a sidecar computing module that has an operating system (OS) that supports the container host daemon. In another embodiment, the proxy node 32 may be implemented directly on a core of the control system 66 that is configured (e.g., partitioned), such that the control system 66 may operate using an operating system that allows the container node 30 to execute orchestration commands and serve as part of the container orchestration system 24. In either case, the proxy node 32 may serve as a bi-directional bridge for IT/OT orchestration that enables automation functions to be performed in IT devices based on OT data and in OT devices 67 based on IT data. For instance, the proxy node 32 may acquire OT device tree data, state data for an OT device, descriptive metadata associated with corresponding OT data, versioning data for OT devices 67, certificate/key data for the OT device, and other relevant OT data via OT communication protocols. The proxy node 32 may then translate the OT data into IT data that may be formatted to enable the master container node 62 to extract relevant data (e.g., machine state data) to perform scheduling operations and to ensure that the container orchestration system 24 and the connected control systems 66 are operating at the desired state. Based on the results of its scheduling operations, the master container node 62 may issue supervisory control commands to targeted OT devices 67 via the proxy nodes 32, which may translate and forward the translated commands to the respective control system 66 via the appropriate OT communication protocol.

In addition, the proxy node 32 may also perform certain supervisory operations based on its analysis of the machine state data of the respective control system 66. As a result of its analysis, the proxy node 32 may issue commands and/or pods to other nodes that are part of the container orchestration system 24. For example, referring to FIG. 3, the proxy node 32 may send instructions or pods to other worker container nodes 68 that may be part of the container orchestration system 24. The worker container nodes 68 may corresponds to other container nodes 30 that are communicatively coupled to other control systems 70 for controlling other OT devices 71. In this way, the proxy node 32 may translate or forward commands directly to other control systems 70 via certain OT communication protocols or indirectly via the other worker container nodes 68 associated with the other control systems 70. In addition, the proxy node 32 may receive replies from the control systems 70 via the OT communication protocol and translate the replies, such that the nodes in the container orchestration system 24 may interpret the replies. In this way, the container orchestration system 24 may effectively perform health checks, send configuration updates, provide firmware patches, execute key refreshes, and provide other services to OT devices 71 in a coordinated fashion. That is, the proxy node 32 may enable the container orchestration system 24 to coordinate the activities of multiple control systems 66 and 70 to achieve a collection of desired machine states for the connected OT devices 67 and 71.

Accordingly, the systems and methods discussed above may improve operations of the industrial automation system 10 including the OT network controlled by the IT network. The IT network may operate automatically or based on receiving user inputs to improve control functions of the OT network based on providing improved visibility to operations of the OT network. For example, the IT network may cohesively control operations of multiple factories in different locations based on receiving multiple API calls and/or synchronization pulses (e.g., the synchronization pulse 76 discussed above) from different electrical power utility companies.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An industrial automation system, comprising:
a first plurality of devices configured to perform one or more operations;
a first container node configured to:
receive a first API call from a first external application programming interface (API) indicative of a first time window for monitoring electrical power consumption of the first plurality of devices by the first external API; and
output one or more first information technology (IT) commands in response to receiving the first API call, wherein the one or more first IT commands are configured to cause at least one of the first plurality of devices to adjust the one or more operations during the first time window;
a second container node communicatively coupled to the first container node, wherein the second container node is configured to map the one or more first IT commands to one or more first operation technology (OT) commands; and
a first control system communicatively coupled to the second container node and the first plurality of devices, wherein the first control system is configured to implement the one or more first OT commands on the at least one of the first plurality of devices.

2. The industrial automation system of claim 1, wherein the first external API comprises an electric power supply company.

3. The industrial automation system of claim 1, comprising an electrical power consumption meter coupled to the at least one of the first plurality of devices and the first external API, wherein the electrical power consumption meter is configured to determine electrical power consumption of the at least one of the first plurality of devices, and wherein the first external API is configured to receive the electrical power consumption of the at least one of the first plurality of devices during the first time window via the electrical power consumption meter.

4. The industrial automation system of claim 1, wherein the first API call is indicative of monitoring the electrical power consumption of the at least one of the first plurality of devices by an electric power supply company.

5. The industrial automation system of claim 1, wherein adjusting the one or more operations comprises switching operation modes of each of the one or more operations between a low-power mode, standby mode, or power off mode.

6. The industrial automation system of claim 1, comprising:
a second plurality of devices configured to perform the one or more operations, wherein the first container node is configured to:
connect to a second external API of a second external device coupled to the second plurality of devices;
receive a second API call indicative of a second time window for monitoring electrical power consumption of the second plurality of devices from the second external API; and
output one or more second IT commands in response to receiving the second API call, wherein the one or more second IT commands are configured to cause at least one of the second plurality of devices to adjust the one or more operations during the second time window;
a third container node coupled to the first container node, wherein the third container node is configured to map the one or more second IT commands to one or more second OT commands; and
a second control system coupled to the third container node and the at least one of the second plurality of devices, wherein the second control system is configured to implement the one or more second OT commands on the at least one of the second plurality of devices.

7. The industrial automation system of claim 6, wherein a first factory comprises the first plurality of devices and a second factory comprises the second plurality of devices.

8. The industrial automation system of claim 6, comprising a container orchestration system comprising the first container node, the second container node, and the third container node.

9. The industrial automation system of claim 1, wherein the one or more first OT commands include hardware description language commands.

10. The industrial automation system of claim 1, wherein the one or more first IT commands include software commands.

11. A method, comprising:
receiving, by a container orchestration system of an industrial automation system, a first application programming interface (API) call indicative of a first time window for monitoring electrical power consumption of a first plurality of devices of an industrial automation system from a first external API of a first external device;
outputting, by the container orchestration system, one or more first information technology (IT) commands in response to receiving the first API call, wherein the one or more first IT commands are configured to cause at least one of the first plurality of devices to adjust one or more operations during the first time window; and mapping, by the container orchestration system, the one or more first IT commands to one or more first operation technology (OT) commands, wherein a first control system is configured to implement the one or more first OT commands on the at least one of the first plurality of devices.

12. The method of claim 11, wherein the first external device is configured to monitor the electrical power consumption of the at least one of the first plurality of devices via an electrical power consumption meter of the first plurality of devices.

13. The method of claim 11, comprising:
connecting, by the container orchestration system, to a second external API of a second external device;
receiving, by the container orchestration system, a second API call indicative of a second time window for monitoring electrical power consumption of a second plurality of devices from the second external API;
outputting, by the container orchestration system, one or more second IT commands in response to receiving the second API call, wherein the one or more second IT commands are configured to cause at least one of the second plurality of devices to adjust the one or more operations during the second time window; and
mapping, by the container orchestration system, the one or more second IT commands to one or more second OT commands, wherein a second control system is configured to implement the one or more second OT commands on the at least one of the second plurality of devices.

14. The method of claim 11, wherein the first external device comprises an electric power supply company.

15. The method of claim 11, wherein the one or more first OT commands include hardware description language commands, the one or more first IT commands include software commands, or both.

16. A non-transitory computer-readable medium comprising instructions that, when executed by processing circuitry of a cloud computing system, cause the processing circuitry to perform operations comprising:
receiving a first application programming interface (API) call indicative of a first time window for monitoring electrical power consumption of a first plurality of devices of an industrial automation system from a first external API;
outputting one or more first information technology (IT) commands to a first container node of the industrial automation system in response to receiving the first API call, wherein the one or more first IT commands are configured to cause at least one of the first plurality of devices to adjust one or more operations during the first time window; and
mapping the one or more first IT commands to first operation technology (OT) commands, wherein a first control system of the industrial automation system is configured to implement the one or more first OT commands on the first plurality of devices.

17. The non-transitory computer-readable medium of claim 16, wherein the processing circuitry of the cloud computing system comprises the first container node.

18. The non-transitory computer-readable medium of claim 16, wherein
receiving the first API call and outputting the one or more first IT commands is by the first container node.

19. The non-transitory computer-readable medium of claim 16, wherein the operations comprise:
receiving a second API call indicative of a second time window for monitoring electrical power consumption of a second plurality of devices of the industrial automation system from a second external API;
outputting one or more second IT commands to a second container node of the industrial automation system in response to receiving the second API call, wherein the one or more second IT commands are configured to cause at least one of the second plurality of devices to adjust the one or more operations during the second time window; and
mapping the one or more second IT commands to one or more second OT commands, wherein a second control system of the industrial automation system is configured to implement the one or more second OT commands on the second plurality of devices.

20. The non-transitory computer-readable medium of claim 16, wherein adjusting the one or more operations comprises switching operation modes of each of the one or more operations between a low-power mode, standby mode, or power off mode.

* * * * *